United States Patent [19]
Gouge

[11] 3,808,643
[45] May 7, 1974

[54] ADJUSTABLE CLAMPS

[76] Inventor: Edwin Gouge, 1021 Milwaukee Ave., South Milwaukee, Wis. 53172

[22] Filed: May 30, 1972

[21] Appl. No.: 257,821

[52] U.S. Cl. ................................... 24/19, 24/272
[51] Int. Cl. ......................................... B65d 63/00
[58] Field of Search ....... 24/19, 268, 269, 270, 271, 24/272, 273, 16 PB, 274 R, 170, 191, 188, 178

[56] References Cited
UNITED STATES PATENTS

| | | | |
|---|---|---|---|
| 2,598,369 | 5/1952 | Grandi | 24/170 |
| 1,236,312 | 8/1917 | Jones | 24/273 |
| 2,641,817 | 6/1953 | Brodheim | 24/269 |

FOREIGN PATENTS OR APPLICATIONS

| | | | |
|---|---|---|---|
| 1,256,422 | 2/1961 | France | 24/274 R |
| 121,692 | 11/1947 | Netherlands | 24/273 |
| 24,822 | 2/1902 | Great Britain | 24/273 |

Primary Examiner—Bobby R. Gay
Assistant Examiner—Kenneth J. Dorner
Attorney, Agent, or Firm—Alter Weiss Whitesel & Laff

[57] ABSTRACT

A cable or hose clamp arrangement comprises an eccentric gear with a flexible tongue or strap having a rack of teeth or slots thereon. The strap is wrapped around a cable, hose or similar member, and the tongue is slipped under the gear and pulled tightly while the eccentric gear is in a position which does not engage the tongue. A pin on the gear rotates the gear so that its tooth engages the rack and holds it tightly to prevent unintended counter rotation.

3 Claims, 4 Drawing Figures

PATENTED MAY 7 1974  3,808,643

ADJUSTABLE CLAMPS

My invention relates to adjustable clamps and, more particularly, to strap clamps held in position by means of an attached eccentric action.

Strap clamps find many uses. For example, these clamps may be used to tie together bundles of wires or to hold together a tube and its fitting. The clamp should hold the tied material tightly enough to secure it against rough usage or to withstand fairly severe mechanical stress. For example, a clamp on a radiator hose in a pressurized cooling system must be able to contain substantial pressures. If it is necessary or desirable for a wire to be removed from a strapped bundle or to replace a radiator hose, it should be easy to remove the clamp and thereafter to replace the clamp.

Accordingly, an object of my invention is to provide a strap clamp material that is to be held in a clamped position.

A further object of my invention is to provide a device of the character described that may be applied as a clamp around tubular members of varied diameter.

A still further object is to provide a strap clamp which may be applied and adjusted without requiring either special equipment or mechanical skill.

Strap clamp bands applied to a hose or the like should fit the peripheral surface of the hose or tube to which it is applied. In keeping with an aspect of my invention, a device is designed with an eccentric gear and a rack-like set of teeth on a tongue so that it may be applied to any one of various sizes of hose or tubes with a proper clamping action. The device is exceedingly simple in construction, economical to manufacture, and positive in its performance and function.

Other and further objects of my invention will become more apparent as the description proceeds, when taken in conjunction with the drawings in which.

Figure 1:
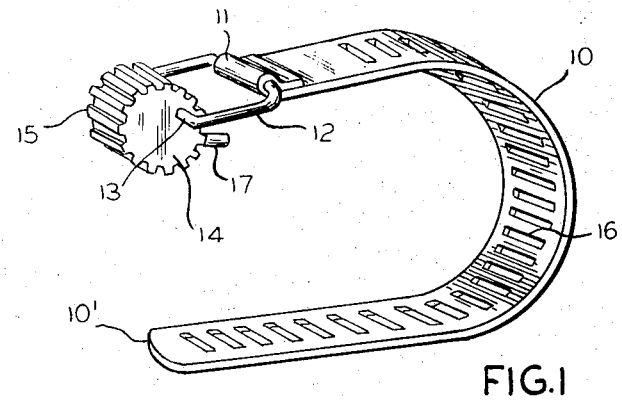
FIG. 1 is a perspective view of the entire assembled device.

Similar reference characters indicate corresponding parts and features throughout the several views. More particularly, the character 10 identifies a tongue, strap or band, constructed of any suitable pliable material, such as metal, plastic of the like. This strap 10 is bent and the end 10' is fed into an open section 11 at its one end. Open section 11 is formed by a preferably metal yoke, shown as 12. The yoke is bent to have a rectangular contour at both its ends 13 for pivotally supporting a cylindrical gear member 14 which is here shown as having a plurality of teeth, ridges, or the like 15. Obviously, this cylindrical member 14 may be constructed of any suitable type of rigid material. The teeth or ridges 15 may be of any form, shape, or contour for making engagement with a rack of teeth or series of slots 16 in the body 10. By referring to the various figures, it will be noted that the cylindrical member 14 is rotatably mounted in an eccentric manner on the ends 13 of the yoke 12. A pin 17 extends outward from the peripheral surface of the member 14. Each of the teeth or series of slots 16 is shaped to fit the ridges 15 on the member 14.

Figure 2:
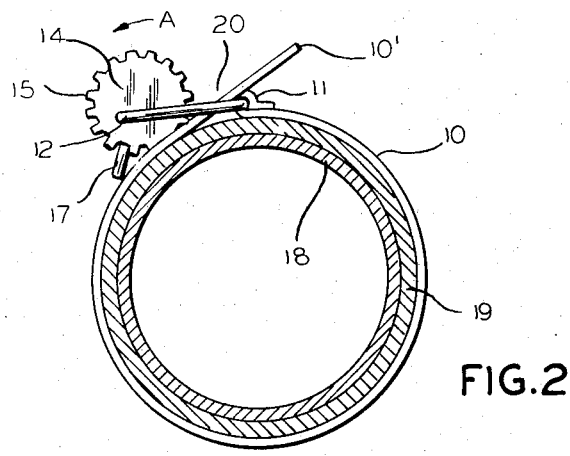
FIG. 2 is a cross-sectional view of a tube and a pliable hose, or the like, with the hose clamped on the tube by means of the clamping device constituting my invention.

In FIG. 2, I show a cross-section of a conventional tube 18 to which a hose 19 or the like is applied. The strap clamp device constituting my invention is wrapped around the outer peripheral surface of the hose 19, or the like (See FIG. 2). The end 10' of the strap is fed through the yoke 12, as shown at 20, and the ridges 15 on the face of the member 14 engage the teeth or slots 16 in the band 10. As the end 10' is pulled, the member 14 is revolved by applying manual pressure on the pin 17, as shown by the arrow A. The band 10 is held in a firm, tightly wedged position due to the eccentric mounting of the member 14. To release the clamp, the pin 17 is lifted by any suitable means such as a screwdriver.

Figure 3:
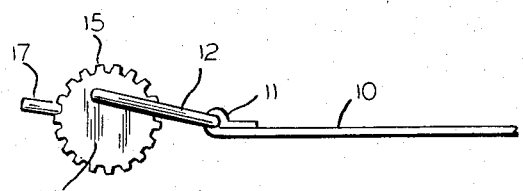
FIG. 3 is a side view of a fragmentary portion of the assembled strap clamp.
Figure 4:
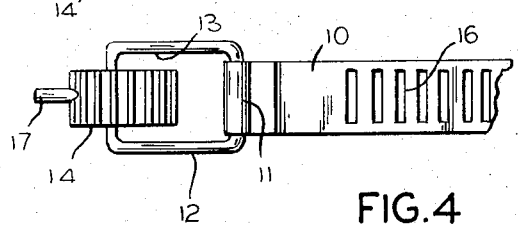
FIG. 4 is a top or plan view of a portion of the strap clamp device.

As shown in FIG. 3, the end 10' of the strap 10 may be extended under the gear 14 to provide a surface against which the gear may be wedged. The pin 17 is fitted into one of the slots 16, after the tightening, in order to lock the clamp in position.

From the above description, it will be apparent that the device is easy to manipulate and apply. Although I have shown a specific construction and arrangement of the parts, many changes may be made without affecting the operativeness of the device. Therefore, the appended claims should be construed to cover all equivalent structures which do not depart from the spirit or the scope of my invention.

I claim:

1. A strap clamp comprising an elongated tongue with a series of fasteners distributed over the length of said tongue, said tongue terminated on one end by a yolk with an eccentric cylindrical gear rotably mounted on said yolk, said gear being shaped, dimensioned and mounted so that the teeth of the gear mesh with and interlock into said fasteners and by its eccentricity it wedges against said tongue and between said fasteners, said gear having a pin projecting outwardly from the peripheral surface of the gear to fit into one of said fasteners, exert leverage against rotation of the gear and to hold said gear stationary while said gear is wedged against said tongue.

2. The clamp of claim 1 wherein said fasteners are a series of slots distributed along the length of said tongue.

3. The clamp of claim 1 and an end of said tongue projecting under said gear to supply a base against which said gear may be wedged as said gear is tightened.

* * * * *